(12) United States Patent
Lemp, III et al.

(10) Patent No.: US 7,010,862 B2
(45) Date of Patent: Mar. 14, 2006

(54) VIEWING AND DISPLAY APPARATUS POSITION DETERMINATION ALGORITHMS

(75) Inventors: Michael Lemp, III, Irvine, CA (US); Michael Hatalski, Irvine, CA (US)

(73) Assignee: Yamcon, Inc., Irvine, CA (US)

( * ) Notice: Subject to any disclaimer, the term of this patent is extended or adjusted under 35 U.S.C. 154(b) by 106 days.

(21) Appl. No.: 10/861,032

(22) Filed: Jun. 4, 2004

(65) Prior Publication Data

US 2005/0268473 A1 Dec. 8, 2005

(51) Int. Cl.
*G01C 17/34* (2006.01)
*G08B 5/00* (2006.01)

(52) U.S. Cl. .................. 33/268; 33/255 R; 33/366.11; 340/815.4; 434/284

(58) Field of Classification Search .................. 33/268, 33/273, 281, 355 R, 366.11, 366.12; 340/815.4, 340/999; 434/284, 289
See application file for complete search history.

(56) References Cited

U.S. PATENT DOCUMENTS

| | | | | |
|---|---|---|---|---|
| 3,769,710 A | * | 11/1973 | Reister | 33/355 R |
| 5,311,203 A | * | 5/1994 | Norton | 33/355 R |
| 6,366,212 B1 | * | 4/2002 | Lemp | 340/815.4 |
| 6,526,667 B1 | * | 3/2003 | Staney | 33/268 |
| 6,570,506 B1 | * | 5/2003 | Lemp, III | 340/815.4 |
| 6,844,822 B1 | * | 1/2005 | Lemp, III | 340/815.4 |
| 2003/0218546 A1 | * | 11/2003 | Lemp, III | 340/815.4 |
| 2005/0030189 A1 | * | 2/2005 | Foster | 33/268 |

\* cited by examiner

*Primary Examiner*—G. Bradley Bennett
(74) *Attorney, Agent, or Firm*—K. David Crockett, Esq.; Crockett & Crockett

(57) ABSTRACT

Celestial object location devices with sensor arrays of having less that one sensor for each of three orthogonal components of gravity and magnetic field vectors. The accuracy of position sensing is enhanced by estimating "missing" sensor input based on input from two orthogonal sensors provided, or determined with limitations from the two gravitational sensors provided.

7 Claims, 3 Drawing Sheets

VIEWING AND DISPLAY APPARATUS POSITION DETERMINATION ALGORITHMS

FIELD OF THE INVENTIONS

The inventions described below relate the field of astronomy, specifically to an electronic device capable of locating and identifying celestial objects.

BACKGROUND OF THE INVENTIONS

Norton, Viewing And Display Apparatus, U.S. Pat. No. 5,311,203 (May 10, 1994) describes a viewing device for identifying features of interest which appear in the field of view of the device. Though Norton was described in the context of a hand-held star-gazing device, and purported to provide information about asterisms (constellations or groups of stars) in the field of view, the device does not work unless held with certain components held perfectly vertical during use. Any twisting or rotation of the device about the viewing axis necessarily causes errors, and introduces ambiguity that cannot be resolved. Thus, it is not possible to implement the Norton system, as proposed by Norton, in a hand-held device. Norton consists of a box-like housing with a viewing channel therethrough, an LCD display and image overlay system for superimposing an image on the field of view, optics for manipulating the superimposed image to make it appear at infinity, a single axis eccentrically weighted inclinometer to measure inclination of the device and three magnetic sensors to determine the bearing of the device, a database with information regarding the constellations which might be viewed with the device, and a microprocessor. The viewing channel establishes a field of view for the user, through which the user can see constellations. The microprocessor is programmed to interpret sensor input and search the database for constellations in the field of view, and transmit a reference display data to the display.

The Norton system suffers from crippling defects. An operational device depends on perfect vertical alignment of the inclinometer. Without perfect vertical alignment of the inclinometer the device cannot unambiguously determine its orientation. The slightest deviation from vertical introduces ambiguity, such that the device can determine only that the viewing channel is aligned somewhere on a wide arc of the sky. If the device is not held perfectly vertically, that is, if it is twisted or rotated about the viewing axis, projection errors are introduced into the output from the inclinometer, so that the device has inadequate information regarding its inclination. In the case that the twist induced error is small enough that the device can determine its viewing axis with enough precision to generate a reference display that corresponds to constellations in the field of view, the device has no way to determine that it is twisted, and thus cannot rotate the reference display to align with the constellation.

Our own patents, Lemp, Celestial Object Location Device, U.S. Pat. No. 6,366,212 (Apr. 2, 2002) and U.S. Pat. No. 6,570,506 (May 27, 2003) and our pending patent application Lemp, U.S. Publication 20030218546 (Nov. 27, 2003) (the entirety of which is hereby incorporated by reference) provides solutions to this problem. Lemp shows a device for viewing celestial objects from a location at a time and date ascertained by the device, comprising a viewing means to observe along a viewing axis defined by an azimuth angle and a nadir angle or altitude; a processor, a multi-axis magnetic sensor adapted to provide the processor with azimuth data representing the azimuth angle, a multi-axis gravitational sensor adapted to provide the processor with nadir data representing the nadir angle; location means for providing location data representing the location of the viewing device to the processor; time means for providing time and date data representing the time and date to the processor; and a database adapted to be accessed by the processor and provide data such that the processor determines celestial coordinates of right ascension and declination corresponding to the viewing axis based on the azimuth data, the nadir data, the location data, and the time and date data. The device can be used to direct a user to a celestial object (its resolution is very high, so that it can direct the user to individual stars and planets, as well as constellations and asterisms) and it can be used to identify an object to which the user has pointed the device.

The position sensing function of the device is most accurately determined using a three axis magnetic sensor and a three axis gravitational sensor. The use of lesser arrays will generally result in reduced accuracy and resolution of the device, such that it will be desirable to improve the resolution with the methods described below, especially when the devices are embodied in celestial object location devices with magnifying optics.

SUMMARY

The devices and methods described below provide for enhanced accuracy of position sensing in a celestial object location device using sensor arrays of less than three axes. Information that would otherwise be provided by a third axis gravitational sensor, for example, is obtained by estimation based on input from the two gravitational sensors provided, or determined with limitations from the two gravitational sensors provided.

DETAILED DESCRIPTION OF THE INVENTIONS

Figure 1:
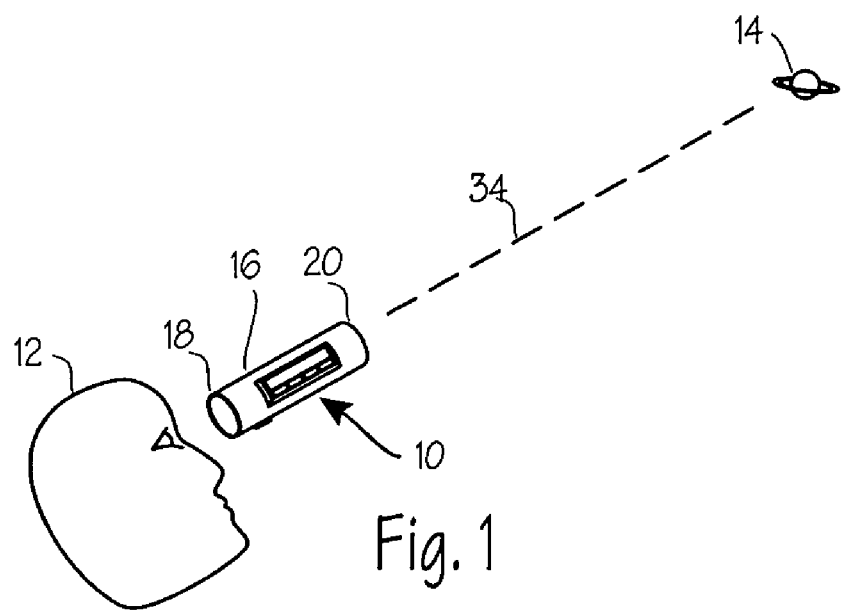
FIG. 1 shows a celestial object location device.

FIG. 1 shows a celestial object location device (COL device) 10 is being used by a user 12 to locate a celestial object 14. The COL device 10 has housing 16 adapted to be hand-held. Other embodiments of the device may or may not be hand-held. Non-limiting examples of such embodiments naturally include telescopes, binoculars, eyepieces, headpieces, and any means for viewing objects. The housing 16 of the COL device 10 has a first view port 18 that is held proximate to the user 12 and a second view port 20 proximate to the celestial object 14. During use, the view ports 18 and 20 are aligned between the user 12 and the celestial object 14 and the COL device 10 is adapted such that the user views the celestial object through the COL device along a viewing axis 34. Operation of the system is accomplished through one or more microprocessors operably connected to the sensors, a database, and user input mechanisms, and outputs such as a side panel display, an aperture stop display, images superimposed on the field of view, images communicated to a remote display, or audio segments played on a speaker or headphone or other suitable output means. The microprocessor may provide images or audio contents containing identifying data or locating instructions (as described in our U.S. Pat. No. 6,366,212, which is hereby incorporated by reference) to the output means.

Figure 2:
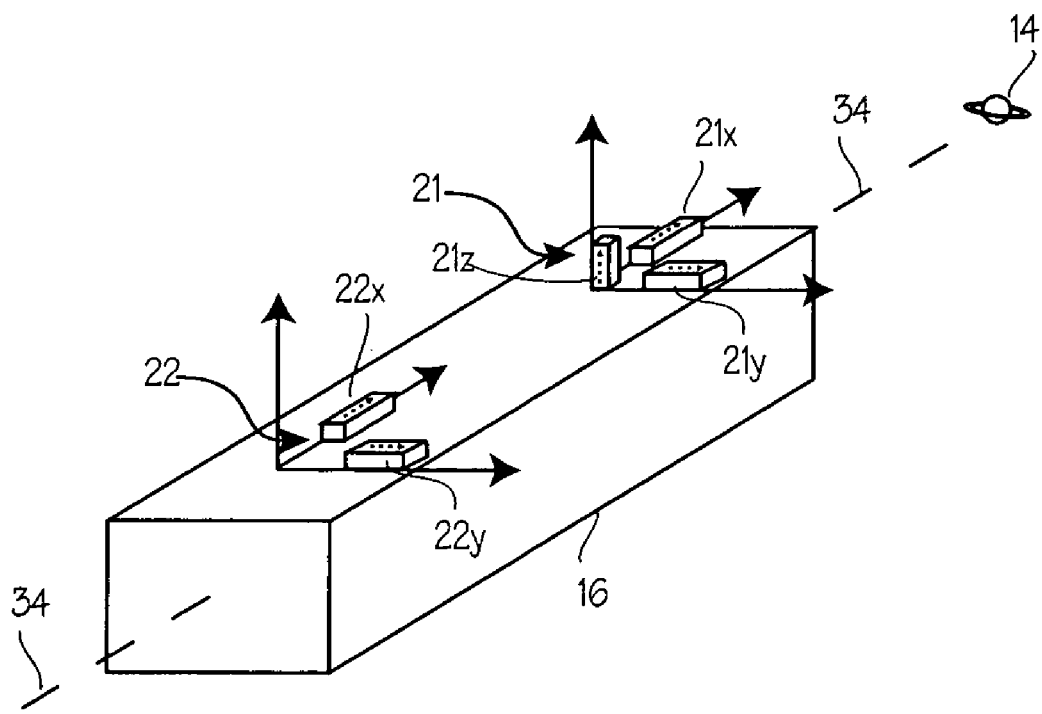
FIG. 2 illustrates the arrangement of the position sensor arrays in relation to the viewing axis of the celestial object location device.

FIG. 2 illustrates the arrangement of the position sensor arrays in relation to the viewing axis of the celestial object location device. A magnetic field sensor array 21 and a gravitational sensor array 22 are mounted on the housing 16, in fixed relationship to the viewing axis 34. The magnetic field sensor array 21 includes one magnetic sensor for each axis associated with a coordinate system defined relative to the device and its viewing axis. (This coordinate system is defined by the viewing axis, a second axis perpendicular to the viewing axis and initially oriented upward relative to the ground when in use, and a third axis perpendicular to the first and second axes (initially parallel to the ground). Though these axes may be conceived of as vertical or horizontal when considering the methods described herein, the tilting and twisting of the device in use will cause these axes to shift with no essential relationship to the terrestrial coordinate systems.) A first magnetic field sensor 21x is aligned parallel to the viewing axis, and a second magnetic field sensor 21y is arranged perpendicular to the first sensor, and a third magnetic field sensor is aligned perpendicular to the first and second magnetic field sensors, thus forming an array of three orthogonal magnetic sensors. The gravitation sensor array includes a first gravitational sensor 22x arranged in parallel to the viewing axis and a second gravitational sensor 22y arranged perpendicular to the first sensor. Gravitational sensor 22y may be parallel or skewed parallel to the second magnetic field sensor 21y. Each of the magnetic field sensors and gravitational sensors are operably connected to the microprocessor to provide input to the microprocessor.

These arrays of sensors may be used to determine the direction in which the celestial object location is pointed, and the degree to which it is twisted about the viewing axis, within the typical viewing situations. The use of arrays with gravitational sensor arrays and/or magnetic field arrays with sensors oriented on less than three axes will generally result in reduced accuracy and resolution of the device, such that improved accuracy may be desired when the device is embodied in celestial object location devices with magnifying optics, and the devices and methods described herein provide for enhanced accuracy of position sensing in a celestial object location device using sensor arrays of less than three axes. The new methods of calculating position of a celestial object location device which incorporates only two gravitational sensors may be employed if one sensor involves estimating the missing third axis sensor via the magnitude of the existing two, and an estimate or calculation of the magnitude of the local gravity vector, from there it is similar to a full 3+3 system. The degree of error encountered in the necessary calculations can be greatly reduced with the algorithms described in the following paragraphs.

In the first method presented here, the missing component of the gravity information is calculated using the input from the existing sensors. As initial steps, the system is initialized, a process which includes system startup and obtains position data and time data from appropriate sources (preferably GPS and its associated time signal and/or an onboard clock, though time and location can be manually input, or obtained from satellite broadcast time signals and alternative satellite or navigational locating systems). The system then determines error correction factors for sensor characteristics, such as alignment errors, temperature corrections, and other errors and biases. Some of these steps are performed at system startup and periodically during use.

Thereafter, the system receives and interprets input from the magnetic field sensor array and the gravitational sensor array. The algorithm first determines the nadir angle of the device by using the gravitational sensor array to calculate the gravity vector and its relationship to the viewing axis. To accomplish this, the system receives input from the gravitational sensors, and then estimates the input from the "missing" gravitational sensor via an equation such as the following:

$$z=\sqrt{grav^2-(x^2+y^2)}$$

where z is the missing component, grav=estimated or calculated gravity field magnitude for the current location (though the calculation can assume gravity equals one g in most cases, or resort to a more precise gravitational model where additional accuracy is desired), x is the value corresponding to the signal from the gravitational sensor which is parallel to sighting channel (item 22x), and y is the value corresponding to the signal from the gravitational sensor which is perpendicular to sighting channel (item 22y). With this information, the system determines the gravity vector, which is comprised of the direction and magnitude of the sensed gravity.

Figure 3:
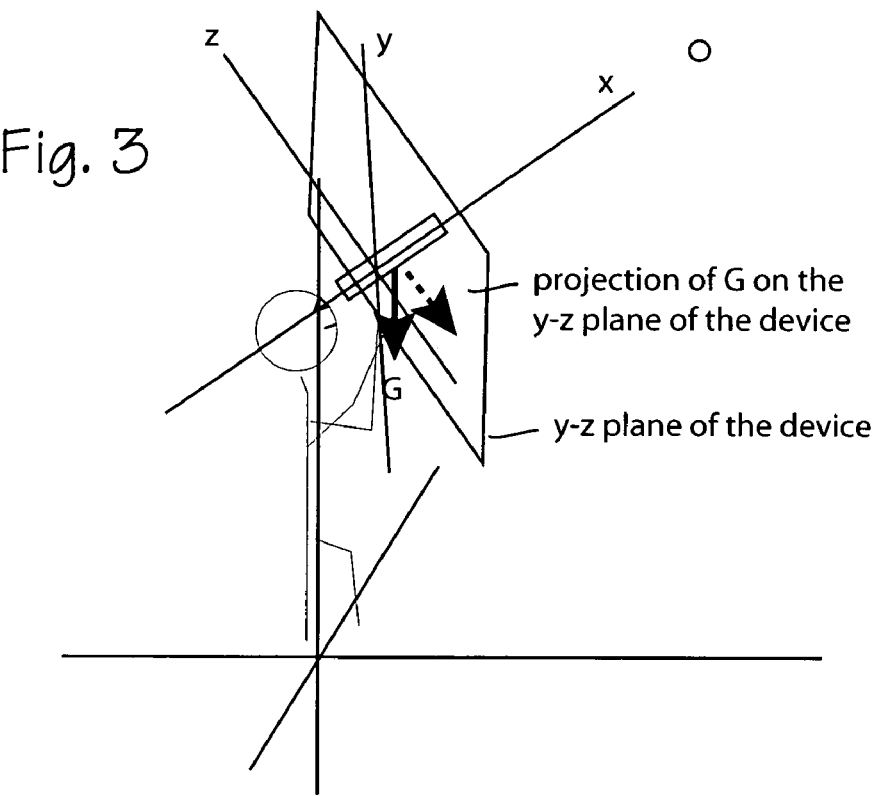
FIGS. 3 through 6 illustrate various transformations accomplished by the device microprocessor in calculating the nadir angle and azimuth angle of the device.

Next, the system calculates a projection of the gravity vector onto the device-coordinate y-z plane. This step is illustrated in FIG. 3. This provides the basis for determining the twist of the device in the next step.

Next, the system determines the "twist" of the device, which is the rotation angle of the gravity vector (or its projection) about the viewing axis, using the y-axis as a starting point. To determine the rotation angle, the microprocessor calculates the angle between the gravitational vector projection and the device y-axis (which is established by gravitational sensor 22y).

Figure 4:
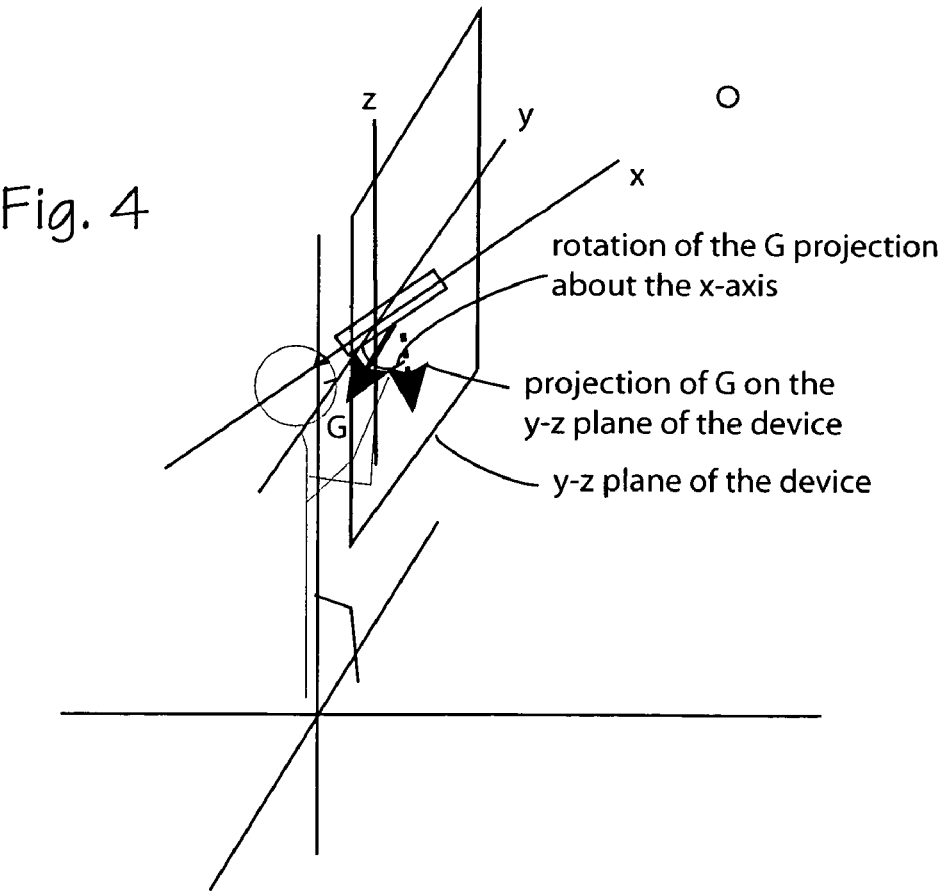

Next, the system virtually "de-rotates" the device by rotating the gravity vector projection about the device x-axis by the rotation angle. This provides the basis for determining the nadir angle of the device, as that is the rotation of the device about its y-axis (which has been rotated to match the local horizontal plane). This step is illustrated in FIG. 4.

Next, the system calculates the nadir angle of the rotated gravity vector projection, using the x-axis sensor.

Figure 5:
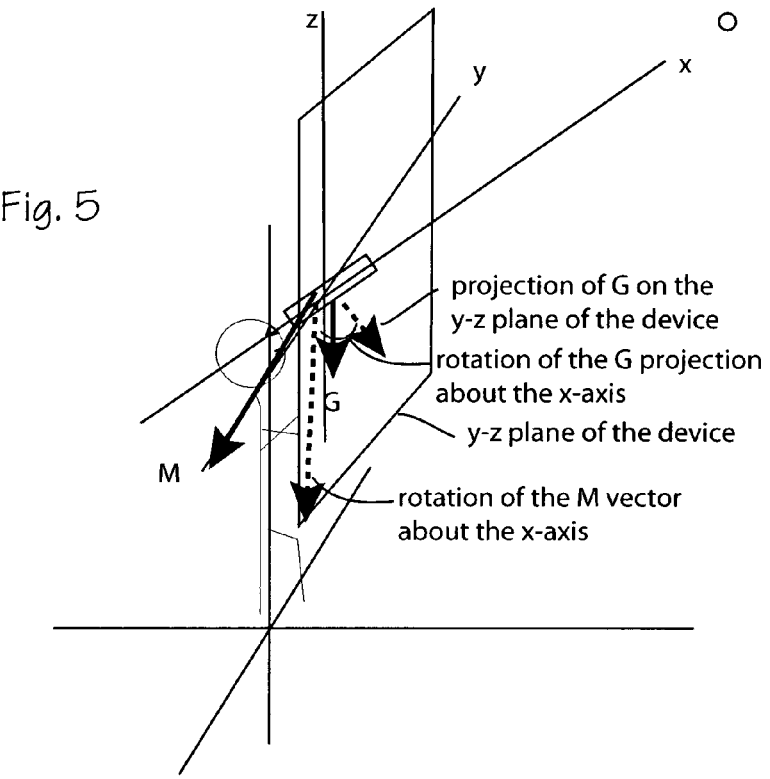
Figure 6:
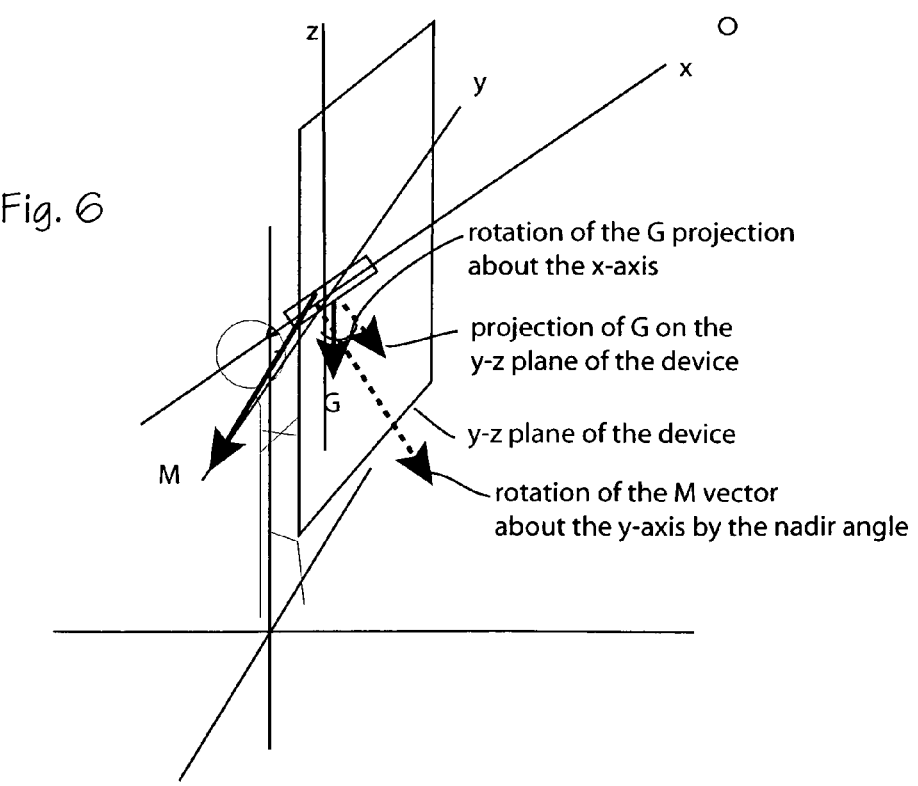

With the nadir angle calculated, the system proceeds to use the input of the magnetic field sensors to determine the azimuth angle. This is done by taking the magnetic field sensor input to calculate a magnetic field vector, and then transforming the magnetic field vector into horizon coordinates (terrestrial coordinates defined relative to the earth's local horizontal plane). This is accomplished by virtually rotating the magnetic field vector about the device x-axis by the rotation angle. This is illustrated in FIG. 5. Next the rotated magnetic vector M is virtually rotated around the device y-axis by the nadir angle to derive the device orientation in the local magnetic field. This is illustrated in FIG. 6. This will orient the device such that its coordinate system is correlated with the terrestrial coordinate system such that the device x-y plane is parallel to the terrestrial horizontal plane. Next, optionally, the system may refer to a magnetic model to ascertain the local dip angle and the expected magnitude of the magnetic field, and this may be used to confirm that output of the magnetic sensors is reliable (this step is more fully described in our co-pending U.S. application Ser. No. 10/444,788, filed May 23, 2003, the entirety of which is hereby incorporated by reference). Next, the resultant magnetic vector is projected onto the local, terrestrial horizontal plane, and the system calculates the azimuth angle (this allows the azimuth angle determination to be independent of the dip angle). The azimuth angle is calculated by determining the angle between projected magnetic vector and device x-axis. Finally, the magnetic declination correction (the difference between local magnetic north and true north) is used to determine the actual azimuth angle.

With the azimuth angle and the nadir angle determined, the device knows where it is pointed in the sky, and can determine, as required by the user input, what celestial objects appear in its field of view (for the identify function) or where the user must be prompted, by appropriate output, to move the device to align the viewing axis with a desired celestial object (for the locate function).

In the second method of position sensing, rather than estimate a third axis gravitational input, the system uses the gravitational sensor parallel to the viewing axis (22x) to calculate the altitude, and uses the gravitational sensor perpendicular to the sighting channel to calculate device rotation. Once these two angles are read, calculations proceed in a manner similar to a full 3-axis gravitational/3-axis magnetic field sensor system. Again, as initial steps, the system is initialized, including system startup and obtaining position data and time data from appropriate sources, and the system determines error correction factors for sensor characteristics, such as alignment errors, temperature corrections, and other errors and biases.

Next, the system determines nadir angle on the basis of the input of the x-axis gravitational sensor 22x, using an estimated or known local gravity magnitude (estimated gravity magnitude should be sufficient for handheld devices with little or no magnification). The rotation angle of the device is then determined based on the output of y-axis gravitational sensor 22y, which is perpendicular to the viewing axis. The step of estimating the third axis gravitational vector is not used in this method.

Next, the system determines the azimuth angle as above. This includes determining the overall magnetic field vector M by combining the input from the three magnetic field sensors 21x, 21y and 21z, transforming the magnetic field vector so that it is in terrestrial coordinates with an x-y plane parallel to the local ground plane, and completing this transform to terrestrial coordinates by rotating this vector about the device y-axis by the rotation angle, and projecting this resulting vector onto the terrestrial x-y plane, and then determining the azimuth angle of the device by calculating the angel between the projected vector and the device x-axis. Again, the system may optionally compare the measured magnetic vector with the known local dip angle and the expected magnitude of the magnetic field for correlation with a magnetic model, and the system will preferably add a correction to the calculated azimuth angle for the known magnetic declination correction (suitable corrections techniques are disclosed in our co-pending U.S. application Ser. No. 10/444,788).

For both methods, the system may make use of the known dip angle (which is determined by the known terrestrial position and the magnetic model stored in the database), and the measured magnetic field vector to determine provide additional input to the nadir angle calculation. In this method, the system determines the nadir angle based on the gravitational sensors and the local vertical as established by the comparison of the magnetic vector and the dip angle.

The method described above can be implemented with a variety of gravitational sensors and magnetic field sensors. They can even be implemented with inclinometers instead of gravitational sensors, though the range in which the device can provide accurate location and identify functionality may be limited. Also, the steps indicated above may be accomplished in any appropriate order. Though the calculations have been described in relation to linear algebra techniques suitable for the underlying calculations, the calculations may be performed using spherical trigonometry techniques (such techniques being equivalent to the underlying linear algebra). The methods and devices may be incorporated into Celestial Object Location devices comprising scopes without optics or magnification, telescopes and binoculars, or any other viewing means. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A device for viewing celestial objects comprising:
   viewing means having a viewing axis defined by an azimuth angle and a nadir angle;
   output means for presenting images or audio contents to a user;
   a magnetic field sensor array comprising a first magnetic field sensor aligned in parallel to the viewing axis, a second magnetic field sensor aligned perpendicular to the first magnetic field sensor, and a third magnetic field sensor aligned perpendicular to the first and second magnetic field sensor, each of the magnetic field sensors being operable to provide a signal corresponding to a sensed magnetic field along an axis of the sensor;
   a gravitational sensor array comprising a first gravitational sensor aligned in parallel to the viewing axis, and a second gravitational sensor aligned perpendicular to the first gravitational sensor, each of the gravitational sensors being operable to provide a signal corresponding to a sensed gravity along an axis of the sensor; and
   a microprocessor operably connected to the gravitational sensors, magnetic field sensors, database and output means;
   wherein the microprocessor is programmed to receive input from the magnetic field sensor array and the gravitational sensor array and calculate the nadir angle of the device using signals from the first gravitational sensor to determine a first component of gravity parallel to the viewing axis, and interpreting signals from the second gravitational sensor to determine a second component of gravity perpendicular to the viewing axis, and interpreting the signals from the first and second gravitational sensors to estimate a third component of gravity perpendicular the first and second components of gravity.

2. The device of claim 1, wherein the microprocessor is further programmed to perform the steps of:
   determine a gravity vector using the signals for the two gravitational sensors;
   calculate a projection of the gravity vector on the device y-z plane defined by the second gravitational sensor and being perpendicular to the viewing axis; and
   determining the rotation angle of the device by calculating the angle between the gravitational vector projection and the device y-axis defined by the second gravitational sensor.

3. The device of claim 2, wherein the microprocessor is further programmed to perform the steps of:

determining the nadir angle of the viewing axis by virtually de-rotating the gravity vector projection about the device x-axis by the rotation angle; and calculating the nadir angle of the rotated gravity vector projection.

4. The device of claim 3, wherein the microprocessor is further programmed to perform the steps of:

determining the azimuth angle of the viewing axis by receiving the signals from the first, second and third magnetic field sensors to calculate the magnetic field vector;

rotating the magnetic field vector about the device x-axis by the rotation angle;

further rotating the magnetic field vector about the y-axis by an angle equal to the nadir angle;

projecting the rotated magnetic field vector onto the horizontal plane; and calculating the azimuth angle by determining the angle between the projected magnetic vector and the device x-axis.

5. The device of claim 1 wherein the microprocessor is programmed to estimate the third component of gravity by the equation $z=\sqrt{grav^2-(x^2+y^2)}$, where z is the third component of gravity, grav=estimated or calculated gravity field magnitude for the current location, x is the value corresponding to the signal from the first gravitational sensor, and y is the value corresponding to the signal from the second gravitational sensor.

6. A device for viewing celestial objects comprising:

viewing means having a viewing axis defined by an azimuth angle and a nadir angle;

output means for presenting images or audio contents to a user;

a magnetic field sensor array comprising a first magnetic field sensor aligned in parallel to the viewing axis, a second magnetic field sensor aligned perpendicular to the first magnetic field sensor, and a third magnetic field sensor aligned perpendicular to the first and second magnetic field sensor, each of the magnetic field sensors being operable to provide a signal corresponding to a sensed magnetic field along an axis of the sensor;

a gravitational sensor array comprising a first gravitational sensor aligned in parallel to the viewing axis, and a second gravitational sensor aligned perpendicular to the first gravitational sensor, each of the gravitational sensors being operable to provide a signal corresponding to a sensed gravity along an axis of the sensor;

a microprocessor operably connected to the gravitational sensors, magnetic field sensors, database and output means;

wherein the microprocessor is programmed to receive input from the magnetic field sensor array and the gravitational sensor array and calculate the nadir angle of the device using signals from the first gravitational sensor and determining the rotation angle of the device based on the output of the second gravitational sensor.

7. The device of claim 6, wherein the microprocessor is further programmed to perform the steps of:

determining the azimuth angle of the viewing axis by receiving the signals from the first, second and third magnetic field sensors to calculate the magnetic field vector;

rotating the magnetic field vector about the device x-axis by the rotation angle;

further rotating the magnetic field vector about the y-axis by an angle equal to the nadir angle;

projecting the rotated magnetic field vector onto the horizontal plane; and calculating the azimuth angle by determining the angle between the projected magnetic vector and the device x-axis.

* * * * *